United States Patent [19]

Bogner et al.

[11] Patent Number: 4,532,096

[45] Date of Patent: Jul. 30, 1985

[54] METHOD OF SHAPING ARTICLES USING SHAPING SURFACES HAVING RELEASE AGENT COATING

[76] Inventors: Ben R. Bogner, 1144 N. President, Wheaton, Ill. 60187; Frank C. Grant-Acquah, 3715 N. Salem Walk, Northbrook, Ill. 60062

[21] Appl. No.: 493,092

[22] Filed: May 9, 1983

[51] Int. Cl.$^3$ .......................... B22C 3/00; B22C 9/02; B29J 5/00
[52] U.S. Cl. ................................ 264/109; 106/38.22; 156/62.2; 156/289; 164/15; 164/138; 264/338; 427/133; 427/135
[58] Field of Search .................... 164/14, 72, 74, 138, 164/15; 106/38.22; 427/133, 134, 135; 156/62.2, 62.4, 62.6, 62.8, 289; 264/338, 109

[56] References Cited

U.S. PATENT DOCUMENTS

| | | | |
|---|---|---|---|
| 2,666,685 | 1/1954 | Hommel et al. | 106/38.22 |
| 2,884,432 | 4/1959 | Gordon | 106/38.22 X |
| 3,401,735 | 9/1968 | Pursall | 164/72 X |
| 3,684,756 | 8/1972 | Brooks | 106/38.22 X |
| 3,986,997 | 10/1976 | Clark | 524/300 |

Primary Examiner—Nicholas P. Godici
Assistant Examiner—J. Reed Batten, Jr.
Attorney, Agent, or Firm—Neuman, Williams, Anderson & Olson

[57] ABSTRACT

Method of forming or shaping a resin-bound mass (e.g., core-making or mold-making pattern or core box, particle board, etc.) in or from shaping means having shaping surfaces and releasing the shaped resin-bond mass from the shaping surfaces, which comprises coating the shaping surfaces of the shaping means with an improved, substantially stable, alcoholic dispersion or solution of a release coating suitable for repeated use, heating the coated shaping surfaces of the shaping means for sufficient time to convert the coating thereon to a stable, cured, abrasive-resistant release coating, placing a curable resin-bound mass of solids to be shaped against the release-coated shaping surfaces, curing the resin-bound mass, and separating the cured resin-bound mass from contact with the release coated shaping surfaces. The coating composition comprises a substantially stable alcoholic dispersion or solution of a substantially pure silanol of the formula RSi(OH)$_3$ or partial condensate of one or more silanols of the formula RSi(OH)$_3$, wherein R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical.

18 Claims, No Drawings

METHOD OF SHAPING ARTICLES USING SHAPING SURFACES HAVING RELEASE AGENT COATING

This invention relates to mold release agents and more particularly to an external release agent for use in conjunction with a mold surface.

BACKGROUND OF THE INVENTION

In foundries, molten metal is poured into a metal shaping cavity in which, upon cooling, the metal assumes the shape of the cavity as defined by surfaces at the walls of the cavity as well as by surfaces of projects extending into or suspended within the cavity. The wall surfaces and inside surfaces are typically the surfaces of bound sand elements. The outside elements are referred to as "molds," and the inside surfaces are the surfaces of elements called "cores." Of course both of these surfaces are "molding" or metal shaping surfaces. Both of these types of metal shaping elements are, in turn, formed by other "molding," i.e. sand shaping elements which, in the trade, are called "patterns," and "core boxes" respectively. Even though the "core box" term is used, the core box is, of course, a pattern, or sand shaping element, as well. Thus, in this application when the term "pattern" is used it is intended to refer to both the element for shaping the sand molds as well as to the element for shaping the sand cores.

The pattern elements, namely patterns and core boxes, are manufactured from iron, steel, aluminum, polyurethane, epoxy, and other metals and/or plastics and wood. When molds or cores are made for applications in which the sand is blown into the core box or pattern, the patterns and core boxes are provided with essential vents, and other elements. These vent elements in the patterns and core boxes are normally made from brass, plastic, etc., and often include fine mesh screens made from brass, steel, etc. Such auxiliary vent elements are not usually present in applications in which the sand is hand packed into the pattern or core box.

The pattern materials i.e. the mold-shaping and core-shaping surfaces, which benefit from the process of the present invention are any of the metallic or plastic materials referred to above, and in fact, any plastic or metallic shaping surface.

In the following examples, however, aluminum, steel, core boxes (top steel, bottom aluminum) polyurethane, epoxy, and iron patterns are provided as exemplary.

In general, problems associated with mold release in the manufacture of products may be typified by those experienced in the manufacture of particle boards, and in the manufacture of foundry cores and molds. Generally speaking poor mold release shows up in irregular surfaces in the finished product, which gets worse with successive product regardless of whether glass bottles or rubber balls are being manufactured.

In the particle board industry, four resins, phenol-formaldehyde, melamine-formaldehyde, isocyanate and ureaformaldehyde resins, have been most commonly used for commercially produced interior and exterior particle boards. Of these resins, phenol-formaldehyde resins have become the standard by which all resins are measured, chiefly because they are relatively inexpensive, and have sufficient hydrolytic resistance for exterior applications. However, even phenolic resins have somewhat of a tendency to experience mold-release problems. Organic polyisocyanates have been recognized for some time as useful competitive alternate binders in the manufacture of particle boards. As known in the art and as practiced with phenol-formaldehyde resin, the isocyanate binders, whether in solution or emulsified, are mixed with the wood chip particles utilized as the base for the particle board. A wood chip and binder mixture is then formed into a mat and hot-molded in the desired size. A principal disadvantage of the use of isocyanate has been the increased tendency of the molded particle board to adhere to the cauls of the press thereby creating a buildup of wood particles on the caul, which causes succeeding particle board surfaces to be unnecessarily rough. Such a poor release of the cured particle board from the mold or caul surface creates difficulty in the automatic handling of the cauls.

Previously, the above drawbacks to the use of organic polyisocyanates as particle board binders were minimized or lessened by the incorporation of certain organophosphorus compounds, their derivatives and mixtures thereof as internal release agents with the organic polyisocyanate, as taught in the U.S. Pat. Nos. 4,257,995 and 4,024,088. However, when the organic polyisocyanate binders are mixed with phosphate compounds such as is taught in U.S. Pat. No. 4,257,995 it has been found the isocyanate mixture suffers from a short shelf life and thus must be used within a short period of time in order to avoid the formation of a hard skin or barrier on the upper surface of the isocyanate mixtures. Because of the existence of this barrier, the shelf life of the resulting isocyanate mixture becomes relatively short, thereby limiting the usefulness and effectiveness of an organic polyisocyanate binder incorporating such phosphate internal release agents.

Other approaches to this problem of adhesion of the board to the heated platens involve a sheet, impermeable to the binder resin, placed between the surface of the board and the platen during the forming process, or the coating of the surface of the platen, prior to each molding operation, with an appropriate release agent, or to coat the surface of the particles themselves with a material which will not adhere to the platen. Any of these alternatives, particularly where the process is being operated on a continuous basis, is cumbersome and a drawback to what is otherwise a very satisfactory method of making a particle board with highly attractive structural strength properties.

The problem of mold release, as stated above, is more universal than merely with respect to particle board manufacture. In a general sense then, release of molded articles from molds in which they have been formed has been achieved by coating the surface of the mold cavity with an agent which facilitates release of the molded article from the walls of the mold cavity. This procedure has severe drawbacks. The agent, after molding, adheres either to the walls of the mold cavity or to the surface of the molded article or, in the usual case, to both. Previously, after multiple moldings and application of release agent, the agent tends to build up on the surface of the mold cavity walls and eventually covers and obscures details of the mold cavity surfaces to be imparted to the molded article. Also, the presence of excessive quantities of release agent adhering to the surface of the molded article can,, impede subsequently subjecting the article to further treatment, such as painting or adhering operations. While it is possible to clean the surfaces of molded articles in preparation for painting or adhering operations, this adds to the time and expense of production. Additionally, the need to reapply the release agent after each molding or a limited number of moldings interrupts the molding operation and slows down output.

SUMMARY OF THE INVENTION

Therefore, an object of the subject invention is an improved mold release agent.

Another object of the subject invention is an improved external mold release agent which substantially eliminates the repetitive application of the agent to mold surfaces.

Another object of the subject invention is an improved external mold release agent comprising a stable dispersion of colloidal silica and a silicone resin.

A further object of this invention is a mold release application method which does not require high temperatures for curing, i.e. temperatures substantially above 80° C.

These and other objects are obtained in accordance with the subject invention wherein there is provided an improved external mold release agent comprising a stable alcoholic dispersion of alkyl tri-silanol compound. More specifically, the mold release agent of the subject invention comprises an unpigmented coating composition, being a dispersion, which may include colloidal silica, in lower aliphatic alcohol-water solution of either substantially pure or the partial condensate of one or more silanols of the formula RSi(OH)$_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical. It is preferred that at least 70 weight percent of the substantially pure silanol or the silanol partial condensate be CH$_3$Si(OH)$_3$, and that the coating composition contain 5 to 50 weight percent solids, said solids portion consists essentially of 0 to 90 weight percent colloidal silica (preferably between 0–5%, inclusive) and 10 to 100 weight percent of the silanol or silanol partial condensate, said composition containing sufficient acid to provide a pH in the range of 3.0 to 6.0. In a preferred embodiment substantially all of the solids e.g., 80–100%, consist of alkyl trisilanol. The use of acetic acid in an amount between about 3% and 5% based on the weight of the coating solution is preferred as a catalyst.

Such a mold release agent will provide a durable, maintenance-free coating on a mold which will prevent the sticking and other problems described above when used with polar thermosetting resins such as furan resins, epoxy resins, phenol-formaldehyde resins, isocyanate resins, urethane, and the like.

In accordance with this invention, the nonvolatile solids portion of the coating composition is essentially a mixture of colloidal silica and the substantially pure silanol or the partial condensate of a silanol. The major portion of the partial condensate or siloxanol is obtained from the condensation of CH$_3$Si(OH)$_3$; a minor portion, if desired, being obtained from condensation with C$_2$H$_5$Si(OH)$_3$; a minor portion, if desired, being obtained from condensation with:

C$_2$H$_5$Si(OH)$_3$, C$_3$H$_7$Si(OH)$_3$, CH$_2$=CHSi(OH)$_3$, $$CH_2=CHCCOO(CH_2)_3Si(OH)_3, \quad CH_2CHCH_2O(CH_2)_3Si(OH)_3$$
$$\underset{CH_3}{|} \qquad \qquad \underset{O}{\diagdown \diagup}$$

or mixtures thereof. As indicated, these substantially pure silanols can be used in the solution to provide the solids in the cured coating. From both the standpoint of economy and optimum properties in the cured coating, it is presently preferred to utilize all monomethyltrisilanol in formulating the composition.

An entirely satisfactory release agent composition for use in this invention is available from Dow Corning as ARC-Q9-6313, and is described more fully in U.S. Pat. No. 3986997, which teachings are incorporated herein in their entirety.

As stated above, the production process of particle board has mold release problems representative of the problem of molding in general. As a result, the following example, though dealing specifically with the production of particle boards, is also considered representative of the solution of mold release problems for metal molds in the molding of polar thermosetting resins. Other examples, in less detail, are set forth showing the broad spectrum use of the subject invention where formulations and environments do not involve the use of halogenated substances, which apparently form acids such as hydrochloric acid, attack the mold surface and damage or destroy its bond to the mold surface.

In the following examples, all parts expressed are parts by weight and all percentages are expressed in percent by weight based on the weight of the composition then referred to.

EXAMPLE I

Aluminum Cauls for Particleboard

Particle board was fabricated by spraying the cellulosic or wood chip particles with the components of the binder composition in combination while the particles are tumbled or agitated in a blender or like mixing apparatus. The binder system is added in an amount equal to 2–8 percent by weight of the cellulosic material based on the dry weight of the particles. If desired, other materials such as fire retardants, pigments, and the like may also be added to the particles during the blending stage.

After blending sufficiently to form a uniform mixture, the coated particles are formed into a loose mat or felt, containing between about 4 percent and 18 percent moisture by weight. Prior to placing the mat on the press, the aluminum cauls are first cleaned and then sprayed with the mold release agent of the subject invention, i.e., a stable dispersion of colloidal silica and silicone resin. The cauls are then heated for 1 hour at 300° F. Other methods of application may also be used, such as by wiping, brushing, dipping, and the like. The mat is then placed in a heated press (300°–450° F.) between the treated caul plates and compressed (300–700 psi) to consolidate the particles into a board. Pressing times, temperatures, and pressures may vary widely, depending on the thickness of the board produced, the desired density of the board, the size of the particles used and other factors well known in the art. The examples presented in Table I, below, were boards prepared with 3 percent resin solids on an oven dry wood basis to form ⅜″ thick boards, felted to a target density of 0.6 g/cc and pressed at 500 psi and 350° F. for 7 minutes. With the mold release silica and silicone resin dispersion of the subject invention applied as set forth above, it was possible to make thirty-seven particle board panels without the mold caul bonding to the board. The surface did not become dull and did not have adhesive or wood fiber build-up.

In the following Table I, the efficacy of various known mold release agents on aluminum molding surfaces are compared with that of the subject invention. The procedure utilized in Example I for preparation of the mat and the cauls is identical with those exceptions noted:

TABLE I

| External Mold Release Agent | Number of Releases Before Sticking |
|---|---|
| DC 200 (silicone oil)[1] | 2 |
| Lecithin[2] | 3 |
| Carnauba Wax[3] (high melt point wax) | 10 |
| Release Agent of Example I | 37 |

[1] Available from Dow Corning Corporation; wiped on at ambient temperatures.
[2] Available from A. E. Staley Corporation; a paste with hydrocarbon carrier, rubbed on at ambient temperatures.
[3] Available from Stoners Ink Company; a high melting point wax in a turpentine solution; sprayed on heated platen, 300° F.

EXAMPLE II

Cold Rolled Steel and Stainless Steel Cauls for Particleboard

Particle boards were formed as in Example I with a 7% binder level of 75% polymeric isocyanate (MR 200 available from Mobay Corp.) and 25% furfural. Preparation of the plates was identical to that of Example I, i.e., washed, rinsed, and dried; the release agent of the subject invention was sprayed on and cured at 300° F. for 30 minutes. The following results were obtained.

TABLE II

| External Mold Release Agent | Number of Releases Before Sticking |
|---|---|
| DC 200 (silicone oil)[1] | 2 |
| Lecithin[2] | 3 |
| Carnauba Wax[3] (high melt point wax) | 10 |
| Release Agent of Example I | |
| Aluminum plates | 57 |
| Stainless steel | 30 |
| Cold rolled steel | 30 |

[1] Dow Corning Corporation
[2] A. R. Staley Corporation
[3] Stoner Ink Company

EXAMPLE III

Aluminum Foundry Molds

An aluminum sheet was coated with the release agent of the subject invention according to the procedures outlined in Examples I and II. The coated sheet was placed in the bottom of a mold with tapered sides. Fifty hand-packed moldings were prepared utilizing a furan resin binder available from CL Industries Inc. as "IDFS". The coated aluminum sheet covered the entire square bottom of the mold. The S.A.P.I.C. process for gassing the core with the $SO_2$, as described in U.S. Pat. No. 3,879,339, was used to cure the moldings. Release of the cured and molded core from the aluminum sheet was very good for more than 50 moldings. No residual sand was evident on the coated surface at the end of the run. Some stain buildup from the $SO_2$ gassing was evident, but easily removed.

EXAMPLE IV

Furan Laminates

The release agent of the subject invention was used in the preparation of furan laminates. Two mold surfaces, one aluminum and one cold rolled steel, were prepared as in Example I. The furan laminate was prepared by preparing a furan resin as follows: a solution of furfuryl alcohol resin in furfural (20%) with a viscosity of 350 cps was mixed with phthaloyl chloride (3.5% by weight of resin). A chopped strand fiberglass mat with surfacing veil was laid on the prepared mold surface and the furan resin was compressed by rolling into the fiberglass mat. Three such plies of resin and glass mat were applied. The laminate was allowed to cure at ambient temperature overnight and stripped from the mold. The first such release off both the aluminum and steel treated mold surface was satisfactory, though it was apparent the release agent coating was stripped off with the laminate, a problem associated in general with furan laminates. The second release from each of the treated mold surfaces yielded a pitted surface on the laminate, with the laminate surface being somewhat uncured, as the acid catalyst appeared to have reacted instead with the metal surface of the mold.

EXAMPLE V

Polyester Laminates

A polyester laminate was prepared as in Example IV, utilizing Corez 227 available from Interplastic Company and catalyzed with 2% MEK peroxide. The mold surfaces were prepared and coated with the release agent of the subject invention in the same manner as in Example I. The laminate was cured for one and a half hours at ambient temperatures. On multiple consecutive moldings, the mold surfaces and the laminate surfaces appeared satisfactory.

EXAMPLE VI

Polyurethane Elastomers

A polyurethane elastomer was prepared using a prepolymer and a glycol extender. The 9.3% free NCO prepolymer was based on the reaction product of diphenylmethane diisocyanate and a primary hydroxy terminated ether glycol (molecular weight approximately 1000, available from The Quaker Oats Company as Polymeg 1000) at a 3/1 NCO/OH ratio. 100 parts of this prepolymer was mixed with 9.5 parts of 1,4 butanediol for 2 minutes at 80° C. The resulting elastomer was poured upon a steel surface coated as in Example I with the release agent of the subject invention and allowed to set for 45 minutes at 110° C. At that time, release properties were preliminarily checked by manually prying up a corner and found to be good. After post-curing at 110° C. for 16 hours, release properties of the elastomer on the coated steel were excellent.

While the invention has been described with reference to a preferred embodient, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLE VII

Low Temperature Cure

The foundry core box of this example is a used two part shaping element, the top having a shaping surface of steel, and the bottom having a shaping surface of aluminum. The bottom portion of the two piece core box included brass vents. All the shaping surfaces of the core box were coated in accordance with the present invention as follows:

1. The shaping surface (including the vents) was sand blasted clean.
2. The coating in accordance with the present invention was sprayed on. The Dow Corning product identified as Q9-6313 abrasion resistant coating (T.M. Dow Corning) is sprayed, as is, on the clean sand-shaping surfaces of the top and bottom elements of the core box. Spraying is preferably conducted relatively slowly and is continued until drips and runs from the surfaces appear eminent. At that time a liquid coating of approximately 3–4 mils will have been applied. Should runs or drips occur, they can be wiped with a soft cloth or a brush. It was found that coatings of excessive thickness did not enhance the beneficial results achieved in accordance with the present invention. and merely resulted in the sloughing off of excess coating.
3. The coated element was allowed to stand at ambient room air conditions for 5–10 minutes until the solvent appeared to be evaporated from the coating,.
4. The thus coated and cured elements were placed into a warm, forced air oven and allowed to cure overnight (approximately 16 hours) at 125° C. The thus coated core box is then used in a comparison test, as set forth below.

The coating material used in this example contained approximately 30% solids including colloidal silica in a composition which is in equilibrium and corresponds to 25 percent methyltrisilanol. The solvent portion of the sprayed material is composed of approximately 20 percent methanol, 15 percent butanol and 30 percent isopropanol. The catalyst is provided by 5 percent acetic acid in the sprayed liquid. (All these % are based on the weight of the spraying solution.)

A foundry sand mixture is charged to the cavity formed by the mated top and bottom portions of the core box to form foundry cores. The foundry sand mixture was used in an amount of 1 percent (based on sand mix) furan binder comprising a polymerized furfuryl alcohol resin, approximately 17 percent of the binder being monomeric furfuryl alcohol. The sand mix also included about 37 percent of a commercial methylethylketone peroxide product, based on the weight of the binder. The thus coated silica sand, when placed in the cavity using the coated core box of this example was then gassed for 1/12 of a second using $SO_2$ gas, followed by a 20 second hot air purge. It should be noted that the sand mix was at room temperature when charged, and that the $SO_2$ gas was preheated to approximately 125° F. and that the purge air was preheated to approximately 200° F. In accordance with the process of this invention, no release problems or stain buildup on the shaping surfaces are observed during the entire test. In this regard, it should be noted that in embodiments not in accordance with the present invention, the sand mixes containing liquid binders tend to result in a "stain" which is believed to be the result of physical wiping of the wet sand, or the result of vapor transported condensate occurring in the microscopic surface structures of the shaping element. In conventional practice, this "stain" which is observed as a gradual buildup of colored solid film-like material, which in extreme cases, as in the conventional methods, finally becomes an accumulated mass which is substantial enough to interfere with, or to provide bonding for, the contained sand mix so that surface deformation problems or mold release problems occur. The so-called stain in conventional methods, provides an adhesion base to which sand grains begin to adhere. In accordance with the present invention an extremely thin visible "stain" is observed after the sand shape is removed, but the buildup does not occur. It is our belief, based on repeated observation, that the smearing of the sand, the wiping of the sand, and other turbulent encounters of the sand mix being charged to the cavity actually results in a removal of the extremely thin visible stain thin the process of this invention. The result is that the abrasion which is so detrimental to the longevity of conventional core boxes and patterns in conventional methods actually enhances the longevity of the core and mold making patterns and core boxes coated in accordance with the present invention.

A total of 600 cores were made in this core box before time constraints required the termination of the test. However, at the end of the test the core box was in outstanding condition, and, although it had a slight visible "stain," the condition of the core box was substantially as it was when the test was begun. There were no release problems or loss of shaping surface integrity or conformation whatsoever after the 600 cycles. In a comparison run using an otherwise identical core box except that it was not coated in accordance with the present invention, it was necessary, after about the first 30 cycles, for the operator to manually clean the box after every fourth or fifth cycle due to build-up of sand and/or "stain." After approximately a total of 60 cycles, the shaping surface was so badly built-up with a tenacious stain film that the manual and physical cleaning did not restore the surface to the original condition, and the following cycles resulted in unacceptable loss of integrity of the configuration of the shaped sand articles vis-a-vis the original pattern.

In accordance with the present invention, however, foundry sand shapes produced after 600 cycles were still substantially identical to the precise configuration as compared to the sand shapes initially made.

Thus, in accordance with the present invention, not only is the economy of the process of making foundry sand shapes vastly improved because of the minuscule cleaning time, and long runs per pattern or core box, the quality of the vast proportion of the resulting foundry sand shapes is also vastly improved.

EXAMPLE VIII

In this illustrative example, the core box-pattern is of the type which is used to shape foundry sand molds for producing air cooling fin assemblies for small internal combustion engines. The core box-pattern of this example includes a shaping surface of polyurethane made from a conventional two-component urethane elastometer. Such core box-pattern configurations typically present significant problems in terms of cleaning and maintaining the core box during repeated production cycles. The core box-pattern of this example was fitted with a plurality of fine steel screen and brass vents. This core box was a used core box, and was sand blast-cleaned. It was coated by spraying using the Dow Corning Q9-6313 abrasion resistant coating. The spraying, as in Example VII was continued until the coating material began to run, and then discontinued. After approximately 10 minutes of ambient air temperature exposure to the air the coating appeared to be "dry" and it was then cured at 80° C. for 4 hours. It is noted that the temperature of this cure is substantially lower than that utilized in Example VII. Curing temperatures substantially above this should be avoided when using plastic core boxes and patterns merely because of the inherent thermal instability of the plastics..

The foundry sand mix as described in Example VII was used in this example in accordance with the S.A.P.-.I.C. U.S. Pat. No. 3,879,339 and after approximately 750 cycles in which sand shapes were produced there was no significant buildup of stain, or other interfering materials on the core box-pattern. The exemplary test was then discontinued due to time constraints. However, in a comparison test using a conventionally treated, otherwise identical core box-pattern, it was found that the stain and sand buildup occurred significantly with a result that after every approximately 70 or so cycles the production had to be interrupted and temporarily discontinued to allow for sand blasting and recoating of the core box-pattern with conventional release agents. In addition, after every 10 or 15 cycles, some manual cleaning was necessary along with reapplication of conventional mold release coating materials. Thus a very high percentage of the production, using the conventional mold release agent, was of a lesser quality in that the gradual buildup naturally results in less true configurations of the molded sand articles, with corresponding loss of configuration in the resulting cast metal article.

Another significant observation was made during this test. It was noted that the very regions of the pattern which were the most difficult to keep clean manually, using the conventional method, namely those associated with the production of the fins, were the areas in which the buildup was the worst. These same surfaces in the method of the present invention, were the parts kept cleanest and most stain free. In the 750 cycles, in accordance with the present invention, these areas apparently involved sufficient natural abrasion by the sand, during the blow-charging of the sand into the cavity, and resulted in absolutely clean shaping surfaces when the process of the present invention was used. Thus the intricate narrow recesses which were the "worst" areas of the conventional sand shaping elements constituted one of the cleanest and best areas in the core box-pattern coated in accordance with the present invention. In fact, more residue (although not enough to interfere with production of high quality configuration shapes) appeared in the flat open areas of the boxes in accordance with the present invention than was observed in the intricate fin-shaping areas.

EXAMPLE IX

In another $SO_2$ gassing test, a cast iron pattern was used to shape sand mixes substantially identical to those used in Examples VII and VIII. Substantial identical resins were used in the sand mix, and substantially identical gassing cycles and per cycles were utilized in this example.

After approximately 1200 sand shape production cycles the pattern was still in excellent condition. Typically, the operators, when using the process and sand shape core boxes-patterns in accordance with the present invention would simply "clean" the cavity of random debris particles with a quick application of the air hose, and would involve no further cleaning, coating, or other restoration of the shaping cavity between production cycles. In a comparison run not in accordance with this invention, but using an identical cast iron pattern, additional conventional mold release agent is applied whenever needed, which usually occurred after every 2 or 3 cycles, and the buildup gradually became so bad (with resulting poor quality production of sand shapes, in the meantime) that after approximately 100 cycles the production had to shut down and the shaping surface restored by sand blasting the accumulated accretions from the shaping surface.

We claim:

1. A method of forming or shaping a resin-bound mass in or from shaping means having shaping surfaces and releasing the shaped resin-bound mass from the shaping surfaces, which comprises
    coating the shaping surfaces of the shaping means with an improved, substantially stable, alcoholic dispersion or solution of a release coating composition suitable for repeated use;
    said coating composition comprising a substantially stable alcoholic dispersion or solution of a substantially pure silanol of the formula $RSi(OH)_3$ or partial condensate of one or more silanols of the formula $RSi(OH)_3$, wherein R is selected from the group consisting of alkyl radicals of 1 to 3 inclusive carbon atoms, the vinyl radical, the 3,3,3-trifluoropropyl radical, the gamma-glycidoxypropyl radical, and the gamma-methacryloxypropyl radical.
    heating the coated shaping surfaces of the shaping means for sufficient time to convert the coating thereon to a stable, cured, abrasion-resistant release coating;
    placing a curable resin-bound mass of solids to be shaped against the release-coated shaping surfaces;
    curing the resin-bound mass; and
    separating the cured resin-bound mass from contact with the release-coated shaping surfaces.

2. The method of claim 1, wherein the release coating composition includes colloidal silica.

3. The method of claim 1, wherein the volatile portion of the alcoholic solution or dispersion of the release coating composition includes an aqueous solution of a lower aliphatic alcohol.

4. The method of claim 1, wherein the alcoholic solution or dispersion of the release coating composition provides a pH in the range of about 3–6 and has about 5–50% by weight of nonvolatile solids; said solids contain about 0–90% by weight of colloidal silica and about 100–10% by weight of said substantially pure silanol of the formula $RSi(OH)_3$ or said partial condensate of one or more silanols of the formula $RSi(OH)_3$; and at least about 70% by weight of said $RSi(OH)_3$ constituency of said substantially pure silanol solids or said partial silanol condensate solids is $CH_3Si(OH)_3$.

5. The method of claim 4, wherein the volatile portion of the alcoholic solution or dispersion of the release coating composition includes an aqueous solution of a lower aliphatic alcohol.

6. The method of claim 4, wherein said solids contain about 0–5% by weight of colloidal silica.

7. A method of forming or shaping cores or molds from a core- or mold-making pattern or core box having shaping surfaces and releasing the shaped core or mold from the shaping surfaces, which comprises coating the shaping surfaces of the pattern or core box with an improved, substantially stable, alcoholic dispersion or solution of a release coating composition suitable for repeated use;

said coating composition comprising a substantially stable alcoholic dispersion or solution of a substantially pure silanol of the formula $RSi(OH)_3$ or partial condensate of one or more silanols of the formula $RSi(OH)_3$, wherein R is selected from the group consisting of alkyl radicals of 1 to 3 inclusive carbon atoms, the vinyl radical, the 3,3,3-trifluoropropyl radical, the gamma-glycidoxypropyl radical, and the gamma-methacryloxypropyl radical;

heating the coated shaping surfaces of the pattern or core box for sufficient time to convert the coating thereon to a stable, cured, abrasion-resistant release coating;

placing a curable resin-bound mass of solids to be shaped against the release-coated shaping surfaces;

curing the resin-bound mass; and separating the cured resin-bound mass from contact with the release-coated shaping surfaces.

8. The method of claim 7, wherein the release coating composition includes colloidal silica.

9. The method of claim 7, wherein the volatile portion of the alcoholic solution or dispersion of the release coating composition includes an aqueous solution of a lower aliphatic alcohol.

10. The method of claim 7, wherein the alcoholic solution or dispersion of the release coating composition provides a pH in the range of about 3–6 and has about 5–50% by weight of nonvolatile solids; said solids contain about 0–90% by weight of colloidal silica and about 100–10% by weight of said substantially pure silanol of the formula $RSi(OH)_3$ or said partial condensate of one or more silanols of the formula $RSi(OH)_3$; and at least about 70% by weight of said $RSi(OH)_3$ constituency of said substantially pure silanol solids or said partial silanol condensate solids is $CH_3Si(OH)_3$.

11. The method of claim 10, wherein the volatile portion of the alcoholic solution or dispersion of the release coating composition includes an aqueous solution of a lower aliphatic alcohol.

12. The method of claim 10, wherein said solids contain about 0–5% by weight of colloidal silica.

13. A method of forming or shaping particle board in a press having shaping surfaces and releasing the shaped particle board from the shaping surfaces, which comprises coating the shaping surfaces of the press with an improved, substantially stable, alcoholic dispersion or solution of a release coating composition suitable for repeated use;

said coating composition comprising a substantially stable alcoholic dispersion or solution of a substantially pure silanol of the formula $RSi(OH)_3$ or partial condensate of one or more silanols of the formula $RSi(OH)_3$, wherein R is selected from the group consisting of alkyl radicals of 1 to 3 inclusive carbon atoms, the vinyl radical, the 3,3,3-trifluoropropyl radical, the gamma-glycidoxypropyl radical, and the gamma-methacryloxypropyl radical;

heating the coated shaping surfaces of the press for sufficient time to convert the coating thereon to a stable, cured, abrasion-resistant release coating;

placing a curable resin-bound mass of fiber board particles to be shaped against the release-coated shaping surfaces of the press;

curing the resin-bound mass; and separating the cured resin-bound mass from contact with the release-coated shaping surfaces.

14. The method of claim 13, wherein the release coating composition includes colloidal silica.

15. The method of claim 13, wherein the volatile portion of the alcoholic solution or dispersion of the release coating composition includes an aqueous solution of a lower aliphatic alcohol.

16. The method of claim 13, wherein the alcoholic solution or dispersion of the release coating composition provides a pH in the range of about 3–6 and has about 5–50% by weight of nonvolatile solids; said solids contain about 0–90% by weight of colloidal silica and about 100–10% by weight of said substantially pure silanol of the formula $RSi(OH)_3$ or said partial condensate of one or more silanols of the formula $RSi(OH)_3$; and at least about 70% by weight of said $RSi(OH)_3$ constituency of said substantially pure silanol solids or said partial silanol condensate solids is $CH_3Si(OH)_3$.

17. The method of claim 16, wherein the volatile portion of the alcoholic solution or dispersion of the release coating composition includes an aqueous solution of a lower aliphatic alcohol.

18. The method of claim 16, wherein said solids contain about 0–5% by weight of colloidal silica.

* * * * *